United States Patent
Svanholm

(10) Patent No.: US 12,292,282 B2
(45) Date of Patent: May 6, 2025

(54) METHOD FOR OPERATING A GEODETIC INSTRUMENT, AND RELATED GEODETIC INSTRUMENT

(71) Applicant: Trimble Inc., Westminster, CO (US)

(72) Inventor: Set Svanholm, Sollentuna (SE)

(73) Assignee: Trimble Inc., Westminster, CO (US)

(*) Notice: Subject to any disclaimer, the term of this patent is extended or adjusted under 35 U.S.C. 154(b) by 187 days.

(21) Appl. No.: 18/117,275

(22) Filed: Mar. 3, 2023

(65) Prior Publication Data
US 2023/0221115 A1    Jul. 13, 2023

Related U.S. Application Data

(63) Continuation of application No. PCT/EP2020/077353, filed on Sep. 30, 2020.

(51) Int. Cl.
G02B 26/10 (2006.01)
G01C 11/02 (2006.01)
G06T 1/20 (2006.01)
H01S 3/101 (2006.01)

(52) U.S. Cl.
CPC .............. *G01C 11/02* (2013.01); *G02B 26/10* (2013.01); *G06T 1/20* (2013.01); *H01S 3/101* (2013.01)

(58) Field of Classification Search
CPC .......... G01C 11/02; G02B 26/10; H01S 3/101
See application file for complete search history.

(56) References Cited

U.S. PATENT DOCUMENTS

| | | | |
|---|---|---|---|
| 6,734,412 B2* | 5/2004 | Kumagai | G01C 15/002 250/559.38 |
| 9,996,748 B2* | 6/2018 | Way | F41G 7/32 |

| | | | |
|---|---|---|---|
| 2010/0208244 A1 | 8/2010 | Earhart et al. | |
| 2012/0044476 A1 | 2/2012 | Earhart et al. | |
| 2017/0219693 A1 | 8/2017 | Choiniere et al. | |
| 2019/0331486 A1 | 10/2019 | Carlen et al. | |

(Continued)

FOREIGN PATENT DOCUMENTS

| | | |
|---|---|---|
| CN | 1512136 A | 7/2004 |
| EP | 0 874 218 A1 | 10/1998 |

(Continued)

OTHER PUBLICATIONS

International Search Report for Application No. PCT/EP2020/077353, mailed May 31, 2021, 2 pages.

*Primary Examiner* — Rebecca C Bryant
(74) *Attorney, Agent, or Firm* — Kilpatrick Townsend & Stockton LLP

(57) ABSTRACT

The present inventive concept relates to a method for operating a geodetic instrument comprising an optical source for assisting a user in aiming at a target in a scene and an imaging device, wherein the imaging device and the optical source share a common optical channel within the geodetic instrument, said method comprising: causing emission, by the optical source, of optical pulses towards the target; causing capture, by the imaging device, of images of the scene using a frame sequence, wherein a frame of said frame sequence includes an exposure time during which the imaging device is exposed to light from the scene; synchronizing emission of the optical pulses to the frame sequence for obtaining data from images in which the optical pulses are absent; and processing the obtained data for surveying said scene.

17 Claims, 6 Drawing Sheets

(56) References Cited

U.S. PATENT DOCUMENTS

2020/0128201 A1  4/2020  Glimm
2020/0141722 A1  5/2020  Körner

FOREIGN PATENT DOCUMENTS

| JP | 4796194 B1 | 10/2011 |
| WO | 2019/073377 A1 | 4/2019 |
| WO | 2022/069031 A1 | 4/2022 |

* cited by examiner

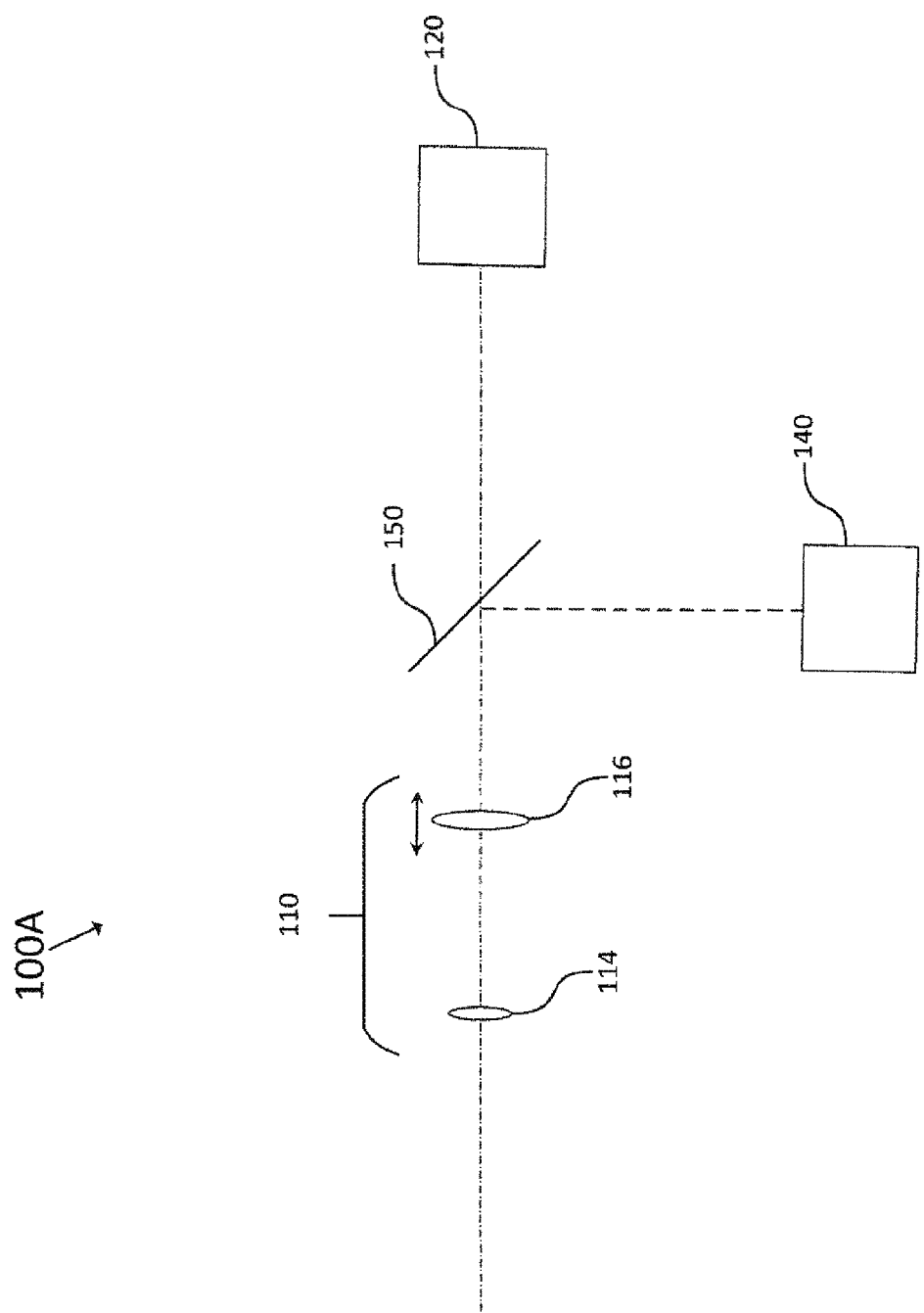

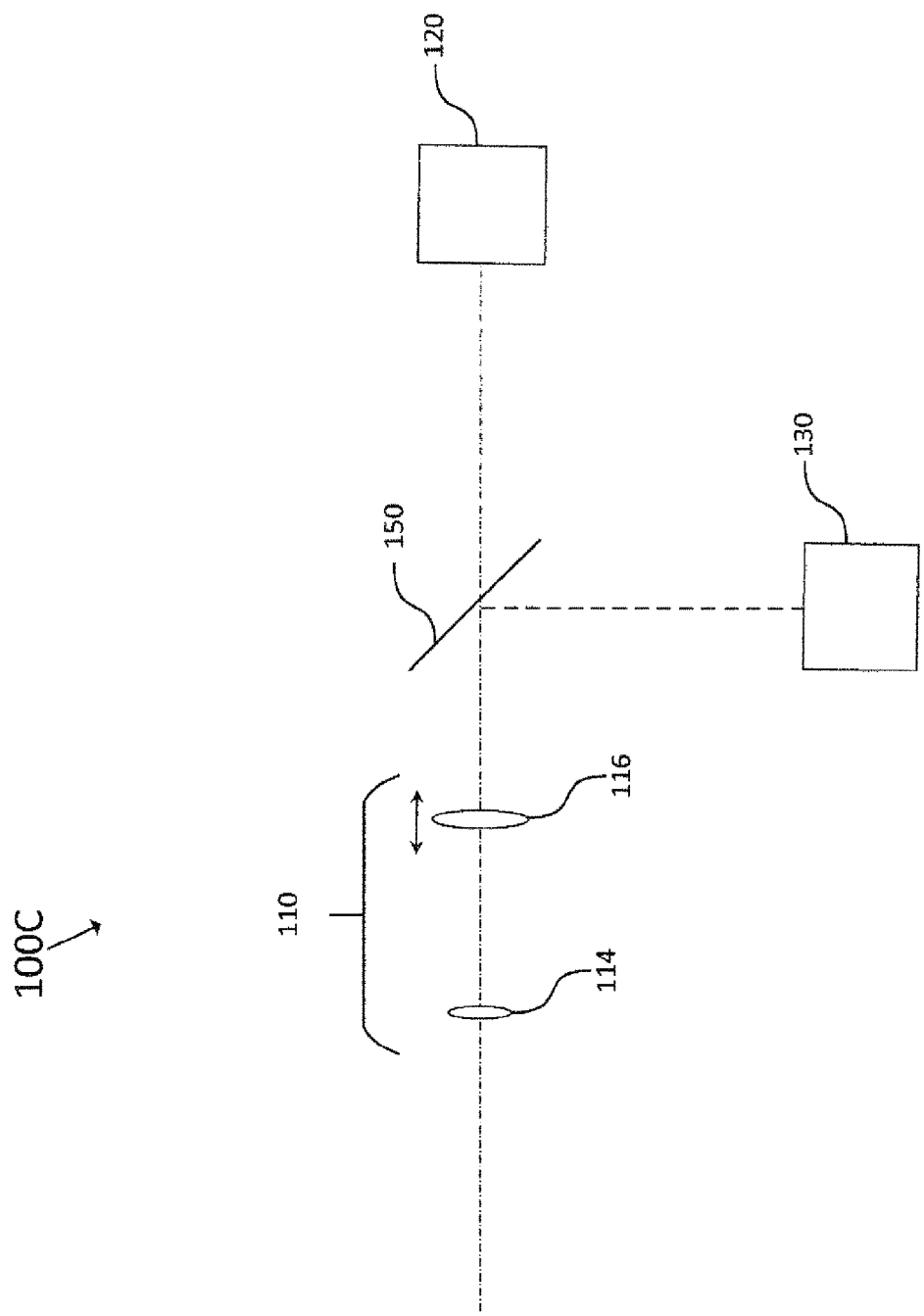

ND RELATED GEODETIC
METHOD FOR OPERATING A GEODETIC INSTRUMENT, AND RELATED GEODETIC INSTRUMENT

CROSS-REFERENCE TO RELATED APPLICATIONS

This application is a continuation of International Application No. PCT/EP2020/077353, filed Sep. 30, 2020, the entire contents of which are incorporated herein by reference in its entirety for all purposes.

TECHNICAL FIELD

The inventive concept described herein generally relates to geodetic instruments.

BACKGROUND

Optical instruments, such as geodetic instruments, are commonly used for measuring a position of an object to obtain information, such as horizontal and vertical angles and distances. Newer instruments are often provided with an electronic imaging device, e.g. a camera, to acquire digital images of the object.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is generally very small, e.g. 1 to 2 degrees, and a user has to position the surveying instrument and adjust the optics of the telescope system so that the object to be sighted and to be measured is exactly in the small field of view of the telescope system and, optimally, on the optical axis of the telescope system, e.g. to measure a distance to the object.

As more functions are added to the surveying instrument, the complexity of the optical setup and electronic control of the instrument increases. Hence, there is a need to more efficiently implement an aiming aid to geodetic instruments.

SUMMARY OF THE INVENTION

It is an object of the present inventive concept to mitigate, alleviate or eliminate one or more of the above-identified deficiencies in the art and disadvantages singly or in combination.

In general, the inventive concept is based on the realization that an imaging device and an optical source for assisting a user in aiming at a target in a scene can share a common optical channel in a geodetic instrument. Such an arrangement achieves a compact optical setup. As a result, calibration of the apparatus and transforming directions with respect to the center of the apparatus can be simplified.

Furthermore, it has also been realized that a geodetic instrument having an imaging device and an optical source sharing a common optical channel may suffer from crosstalk occurring in the common optical channel. The crosstalk is a result of internal arrangement of features in the geodetic instrument, and hence the crosstalk will be generally unaffected by external conditions, such as ambient light variations or light reflected from the optical source by a target in the scene. Such crosstalk may decrease the quality of image data collected by the imaging device, which can interfere with measurements, cause difficulties in identification of features in images, and lessen user experience. Crosstalk may take any shape and form as detected by an imaging device of the geodetic instrument. Furthermore, crosstalk may be located at any position with respect to the pixels of the imaging device. The shape and form of the crosstalk may depend on the beam profile of the optical source, and/or optics of the geodetic instrument. Preferably, the crosstalk does not saturate the imaging device in any pixel with respect to intensity. This can for example be achieved by adjusting the exposure time of the imaging device.

Furthermore, a solution to these problems should preferably allow the imaging device and the optical source to appear unaffected, or minimally affected, in their respective operation as experienced by a user of the geodetic instrument. Hence, the present disclosure also aims to improve geodetic instruments with respect to cross-talk occurring in a common optical channel.

According to a first aspect of the inventive concept, these and other objects are achieved in full, or at least in part, by a method for operating a geodetic instrument comprising an optical source for assisting a user in aiming at a target in a scene and an imaging device, wherein the imaging device and the optical source share a common optical channel within the geodetic instrument. The method comprises causing emission, by the optical source, of optical pulses towards the target and causing capture, by the imaging device, of images of the scene using a frame sequence, wherein a frame of the frame sequence includes an exposure time during which the imaging device is exposed to light from the scene. The method further comprises synchronizing emission of the optical pulses to the frame sequence for obtaining data from images in which the optical pulses are absent and processing the obtained data for surveying the scene.

Hereby, a simpler and more compact optical setup is achieved, wherein the optical source can operate to assist in aiming at a target in a scene, and the imaging device can operate to capture images of the scene, without causing cross-talk in the common optical channel shared with the imaging device. By synchronizing emission of the optical pulses to the frame sequence, images wherein the optical pulses are absent may be captured. The synchronization may be made with respect to e.g. an exposure time of each frame in the frame sequence. Accordingly, the optical source may switch between an operating state and a non-operating state repeatedly during the capture of images using the frame sequence. As will be further discussed in the present disclosure, by adjusting a frequency of such switching and/or a peak power of the optical source, the optical source may generate a spot on a target appearing similar or identical to a spot generated by an optical source operating in a continuous mode.

The frame sequence may comprise a first subset of frames and the synchronizing may comprise causing the optical source to be switched off during the exposure time of each frame of the first subset. Accordingly, the frame sequence will comprise at least some frames, i.e. the first subset of frames, in which the optical source is switched off and thus not able to cause any cross-talk in the common optical channel. As will be further discussed in the present disclosure, the first subset of frames may be utilized in several different manners to partly or fully achieve the objects set out above. It is further to be understood that the different implementations of the first subset of frames may advantageously be combined.

According to an embodiment, the frame sequence further comprises a second subset of frames, the first subset and the second subset being mutually exclusive subsets, the synchronizing further comprising: causing the optical source to be switched on during at least part of each frame of the second subset. The frame sequence may include a frame from the first subset being interleaved with one or more frames from the second subset or wherein the frame sequence includes a frame from the second subset being interleaved with one or more frames from the first subset. Accordingly, the frame sequence may comprise one or several frames, during which the optical source is switched on, interleaved with one or several frames, during which the optical source is switched off.

The method may further comprise discarding data pertaining to each frame of the second subset. Accordingly, a modified frame sequence is formed, containing only the first subset of frames, i.e. frames in which the optical source is turned off. In each place of a discarded frame belonging to the second subset of frames, a previous frame belonging to the first subset of frames may be inserted. In other words, the method may further comprise replacing each frame of the second subset of frames with a respective previous frame of the first subset of frames. The modified frame sequence will thus comprise duplicates of one or several frames in the first subset of frames. Depending on the respective numbers of frames in the frame sequence belonging to the first and second subsets of frames, the number of duplicate frames will vary. Furthermore, if such a modified frame sequence with duplicate frames is displayed on a display unit, a user may experience a lower frame rate owing to some of the frames being displayed for a longer period of time.

It is also envisioned that the discarded data may leave an empty frame in the frame sequence. Such a modified frame sequence will contain frames belonging to the first subset wherein the laser is turned off, and empty frames belonging to the second subset. Similarly, if such a modified frame sequence with empty frames is displayed on a display unit, a user may experience a lower frame rate.

The second subset may include every Nth frame of the frame sequence, wherein N is comprised between 2 and 10. It is also envisioned that the first subset may include every Nth frame of the frame sequence, wherein N is comprised between 2 and 10. It is to be understood that when every Nth frame of the frame sequence is a frame of the second subset, the remaining frames of the frame sequence may be a frame of the first subset, and vice versa. The occurrence of frames belonging to the first and second subsets of frames, respectively, i.e. their frequency in the frame sequence, may be determined based on a frame rate of the imaging device, and/or a peak power of the optical source. For example, an imaging device with a relatively high frame rate may allow for a frame sequence having a higher ratio of second subset frames to first subset frames, since the frames belonging to the first subset alone, i.e. frames in which the optical source is turned off, may provide a sufficient frame rate to be displayed on a display device to a user. Furthermore, the peak power of the optical source may be increased to compensate for the optical source being turned off in frames belonging to the first subset of frames. Owing to the relatively slow integration of a human eye, a user may perceive light emitted from an optical source with increased peak power and a duty cycle of less than 100% as having the same brightness as an optical source with lower peak power being turned on at all times, i.e. with a duty cycle of 100%. The peak power is preferably selected such that the optical source fulfils safety requirements and remains in the classification within the relevant field of implementation.

According to another embodiment, a frame further includes at least one intermission time during which the imaging device is configured to not register light from the scene, the method further comprising: for at least some of the frames of the frame sequence or the first subset, causing the optical source to be switched on during at least part of said at least one intermission time. Accordingly, the imaging device is configured to not register light from the scene during the intermission time and will thus not capture any cross-talk in the common optical channel. Furthermore, it is to be understood that the optical source may be switched off during an exposure time of the frame. In order to achieve an adequate frame rate, a gain of the imaging device may be increased to compensate for a shorter exposure time caused by the presence of the intermission time. Hereby, a duration of each frame, including the exposure time and the intermission time, may be maintained.

The imaging device being configured to not register light from the scene may be achieved by physically blocking light from reaching said imaging device, e.g. by an aperture, and/or by configuring the imaging device to not generate or send any data upon being exposed to light.

Similarly, an exposure time of a frame may be represented by the imaging device being exposed to light, and/or by configuring the imaging device to generate or send data upon being exposed to light.

It is further envisioned that the synchronizing may further include causing the optical source to be switched on during at least part of said at least one intermission time for every Kth frame of the frame sequence, wherein K is comprised between 1 and 10. Alternatively, the synchronizing may further include causing the optical source to be switched on during at least part of said at least one intermission time in respective frames of a group of subsequent frames in the frame sequence. The frame sequence may comprise several such groups of subsequent frames being spaced apart by frames in which the optical source is switched off for the full duration of the frame. In other words, the optical source may be switched off during said at least one intermission time (and thus the whole frame) for every Mth frame, wherein M is comprised between 2 and 10.

The processing of the obtained data may include processing data pertaining to each frame of the first subset. Accordingly, only data pertaining to frames in which the optical source is switched off may be processed. Hereby, a more efficient method for alleviating or eliminating the issue of cross-talk occurring in the common optical channel is achieved with respect to the need of processing resources. Discarding of data pertaining to the second subset of frames may preferably be performed before any kind of compression of the frames in the frame sequence is performed.

The optical source may be a laser pointer, or the optical source of an electronic distance measurement unit of the geodetic instrument.

According to a second aspect, a geodetic instrument is provided. The geodetic instrument comprises an optical source for assisting a user in aiming at a target in a scene and an imaging device configured to capture images of the scene using a frame sequence. The optical source is arranged to emit optical pulses towards the target/scene. A frame of the frame sequence includes an exposure time during which the imaging device is exposed to light emission from the scene. The imaging device and the optical source share a common optical channel within the geodetic instrument. The geodetic instrument further comprises a processing unit configured to synchronize emission of the optical pulses to the frame sequence for obtaining data from images in which the optical pulses are absent and to process the obtained data for surveying the scene. It is envisioned that the geodetic instrument may further comprise a processing unit configured to synchronize emission of the optical pulses to the frame sequence for obtaining data from images in which the optical pulses are absent and to process the obtained data for surveying, observing, monitoring, and/or viewing the scene.

The frame sequence may comprise a first subset of frames, the geodetic instrument being further configured to cause the optical source to be switched off during the exposure time of each frame of the first subset.

The frame sequence may further comprise a second subset of frames, the first subset and the second subset being mutually exclusive subsets, the geodetic instrument being further configured to cause the optical source to be switched on during at least part of the exposure time of each frame of the second subset.

The frame sequence may include a frame from the first subset being interleaved with one or more frames from the second subset. Alternatively, the frame sequence may include a frame from the second subset being interleaved with one or more frames from the first subset.

The geodetic instrument may be further configured to discard data pertaining to each frame of the second subset.

The second subset may include every Nth frame of the frame sequence, wherein N is comprised between 2 and 10. It is further envisioned that the first subset may include every Nth frame of the frame sequence, wherein N is comprised between 2 and 10.

A frame of the frame sequence may further include at least one intermission time during which the imaging device is configured to not register light from the scene, the geodetic instrument being further configured to, for at least some of the frames of the frame sequence or of the first subset, cause the optical source to be switched on during at least part of said at least one intermission time.

The geodetic instrument may further be configured to cause the optical source to be switched on during at least part of said at least one intermission time of every Kth frame of the frame sequence, wherein K is comprised between 1 and 10.

The processing unit may further be configured to process data pertaining to each frame of the first subset.

The optical source may be the optical source of an electronic distance measurement unit, or a laser pointer, of the geodetic instrument. The optical source may be a visible semiconductor laser, or a LED, with a rating in the mW range. Some pulse frequencies will be discussed in the detailed description of the present disclosure. It is however envisioned that the pulse frequency of the optical source may be in the MHz range. Bursts of pulses may thus be synchronized with frames in the frame sequence. Consequently, within a single frame in the frame sequence, the laser may switch on and off several times, depending on the frequency. A sufficiently high frequency may form a laser spot viewed by an observer, either directly viewing the laser spot or viewing the laser spot via a display, as a continuous laser spot.

The imaging device may have a frame rate of at least 10 Hz, such as at least 15 Hz.

According to a third aspect, a processing unit of a geodetic instrument is provided. The processing unit is adapted to determine a distance and/or a direction to a target of a scene. The processing unit may be further configured to operate the geodetic instrument in accordance with a method as defined in any of the embodiments described above with respect to the first aspect.

A feature described in relation to one aspect may also be incorporated in other aspects, and the advantage of the feature is applicable to all aspects in which it is incorporated.

Other objectives, features and advantages of the present inventive concept will also appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of the present inventive concept, with reference to the appended drawings, wherein:

FIG. 1a schematically illustrates one embodiment of a geodetic instrument;

FIG. 1c schematically illustrates one embodiment of the geodetic instrument;

Figure 1B:
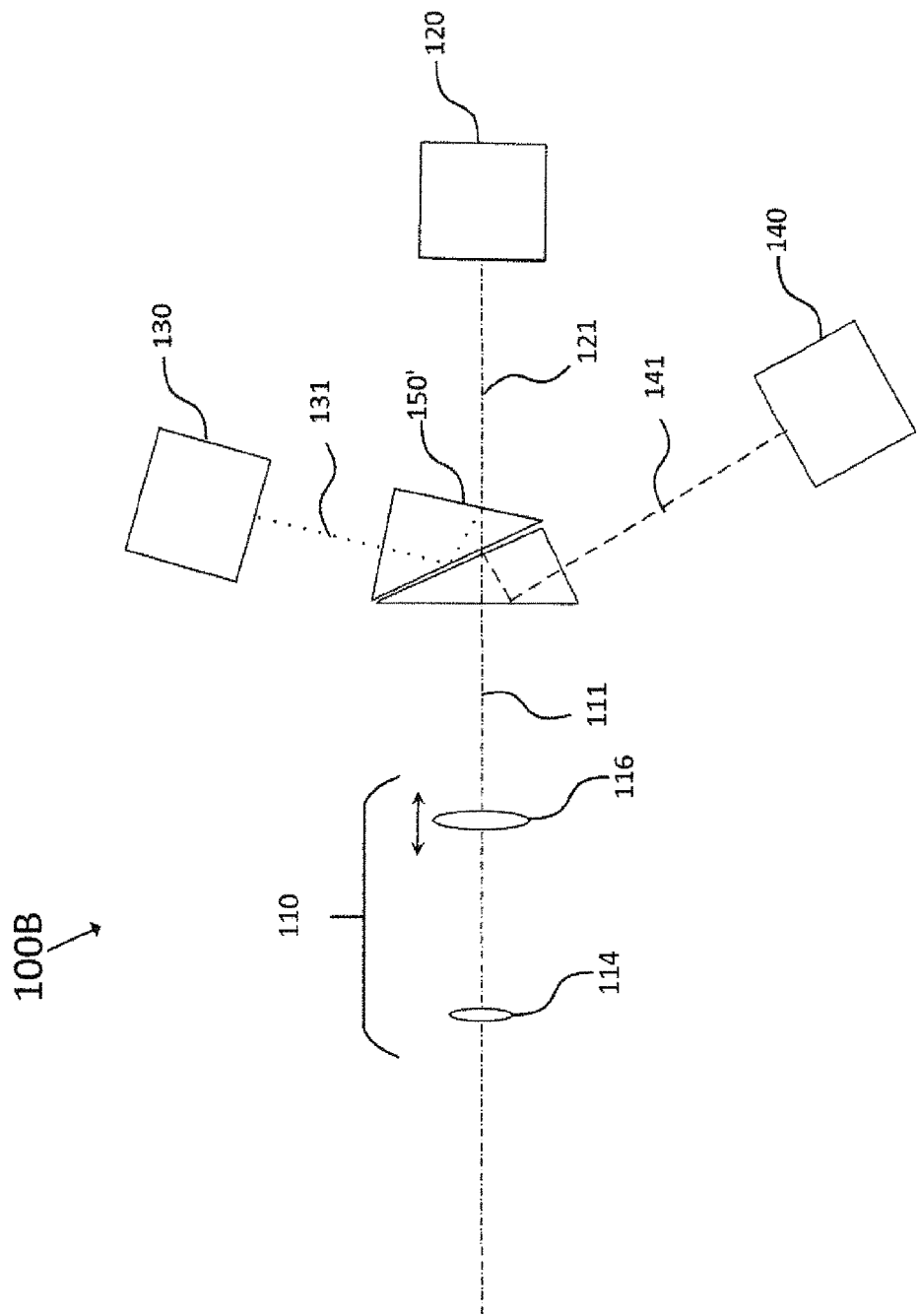
FIG. 1b schematically illustrates one embodiment of the geodetic instrument.

The figures are not necessarily to scale, and generally only show parts that are necessary in order to elucidate the inventive concept, wherein other parts may be omitted or merely suggested.

DETAILED DESCRIPTION

The inventive concept generally relates to the optical functions of a geodetic instrument, e.g. for surveying. In particular, operation of the geodetic instrument according to the inventive concept is advantageous in geodetic instruments having a particular optical setup, as will be further described below with reference to FIGS. 1a, 1b and 1c. Such a geodetic instrument will allow to easily integrate different functional modules into the geodetic instrument over simple interfaces so that several optical paths overlap at least along a lens arrangement. Therefore, the optical paths may have the same lenses of the lens arrangement in common. In more detail, the separation of the optics of the lens arrangement from the distance measuring unit, imaging unit and tracker provides flexibility in the design of the geodetic instrument, wherein the clear and simple interfaces allow adding or replacing such functional modules.

In short, in one embodiment, the geodetic instrument comprises a lens arrangement; an imaging unit configured to obtain an image of at least a part of a target; an optical source, arranged for assisting a user in aiming at a target in a scene and/or arranged as part of a distance measuring unit (or electronic distance measurement unit, EDM unit) configured to measure a distance to the target along the optical axis of the optical source; and a beam splitter/combiner. The beam splitter/combiner combines parts of the optical paths of the imaging unit and the optical source. The optical source may hence be part of a distance measuring unit. It is to be understood however that optical pulses emitted by the optical source are not necessarily distance measuring light or distance measuring pulses. The present disclosure although referring to distance measuring light, should be understood to also comprise embodiments wherein the optical source is configured for assisting a user in aiming at a target. In other words, the optical source may be used as a laser pointer.

In particular, the optical paths are arranged so that the optical axis of the imaging unit and the optical axis of the optical source are coaxial, i.e. parallel and overlapping, with the optical axis of the lens arrangement at least between the lens arrangement and the beam splitter/combiner.

FIG. 1a illustrates elements of a geodetic instrument 100A according to an embodiment. The geodetic instrument 100A comprises a lens arrangement 110, an imaging unit 120, an optical source 140 and a beam splitter/combiner 150.

The lens arrangement 110 is provided to sight an object which is a target, such as a reflector. The optical arrangement 110 includes at least one movably arranged focus lens element 116 for focusing so as to sight the object. For example, the focus lens element may be an individual or compound focusing lens which is moved manually or automatically to produce in focus/out of focus images of the object which may be viewed through an ocular constituting a simple imaging unit. The lens arrangement 110 may be part of a telescope known in the art of surveying, and may comprise several optical lenses, such as lenses 114 and 116, so as to enable focusing and zooming.

The imaging unit 120 is configured to obtain an image of at least a part of the object sighted by the lens arrangement 110. The imaging unit 120 may be a simple lens or an ocular, a.k.a. eyepiece, so that an image can be obtained in the eye of the user. Alternatively, the imaging unit 120 may be a combination of an electronic imaging device, a micro-display and an ocular so that an image can be recorded and viewed conventionally by eye through an ocular. Preferably, the imaging unit 120 is an electronic imaging device, for example, a two-dimensional array of sensor elements capable of generating image information with a number of pixels generally corresponding to the number of elements of the array, such as a charge-coupled device (CCD) camera or a metal-oxide semiconductor (CMOS) camera. Such a sensor array may be composed of 1000×1000 sensor elements or more to generate digital images with $10^6$ image pixels (1 megapixel) or more. However, also smaller sensor arrays are feasible, for example, composed of 480×750 sensor elements, for example. Alternatively, the sensor array may be composed of avalanche photodiodes (APD) forming an APD array. The optical source 140 may be configured to measure a distance to the object along the optical axis of the optical source 140, which constitutes an optical measurement axis. For example, the optical source 140 may use an electronic distance measurement (EDM) to obtain measurement values about the distance. In one example, the optical source comprises a distance measurement unit 140 includes a coherent light source, such as an infrared laser or another suitable laser, e.g. emitting in a red-wavelength range. The distance measuring unit may preferably include a fast reflector-less working EDM. Conventionally, collimated light is sent out in a radial direction from the surveying apparatus 100A to perform a distance measurement by using a pulse method or phase method as known in the art. Further, the intensity of a received EDM-Signal, i.e. the back-reflected signal of an electro-optical distance measurement, could also be used to obtain information about the distance to the reflecting object.

In FIG. 1a, a beam splitter/combiner 150 is provided and configured to combine a part of the optical imaging path of the imaging unit 120 and a part of the optical distance measuring path of the optical source 140 so that the optical axis of the imaging unit 120 and the optical axis of the optical source 140 are coaxially arranged with the optical axis of the lens arrangement at least between the lens arrangement 110 and the beam splitter/combiner 150.

An optical axis may be regarded as an imaginary line that defines the path along which light propagates through the system, up to a first approximation. For a system composed of simple lenses and mirrors, an optical axis passes through the center of curvature of each surface and coincides with the axis of rotational symmetry. The optical path may be regarded as the path that light takes when traversing an optical system, such as the lenses of the lens arrangement 110. The optical (beam) path is usually limited by a three-dimensional volume having the optical axis as an axis of rotational symmetry, in which light may travel.

The optical axis of the imaging unit 120 is shown by the dot-and-dash line and the optical axis of the optical source 140 is shown by the dashed line. No preferred direction is given by the lines (optical reciprocity) but it may be considered that light to be imaged on the imaging unit 120 travels from left to right. The beam splitter/combiner 150 combines these lines to obtain an overlap of the optical axes on the left part of the beam splitter/combiner 150 in FIG. 1a. Since these axes are parallel and overlapping, i.e. coaxial, to each other, and additionally parallel and overlapping to the optical axis of the lens arrangement 110, they are also regarded coaxially arranged with respect to the optical axis of the lens arrangement 110.

In particular, the optical setup and especially the beam splitter/combiner 150 are chosen such that the optical axis of the lens arrangement 110 corresponds to the overlapping optical axes of the imaging unit 120 and the optical source 140 between the beam splitter/combiner 150 and the lens arrangement 110 as well as along the lens arrangement 110 so that light traveling in the respective optical paths is affected by the lenses 114 and 116 of the lens arrangement. Since the optical axes of the optical source 140 and the imaging unit 120 partly overlap, also the optical paths, i.e. the optical imaging path and the optical distance measuring path, of these units partly overlap when being combined by the beam splitter/combiner 150. In the apparatus, the center of the two-dimensional array of sensor elements as imaging unit and the center of the tracking unit do not need to coincide with the optical axis of the lens arrangement 110. For example, in a calibration step, the center can be defined on the two-dimensional array of sensor elements as the point where the optical axis coincides with the array.

It is understood that a coaxial arrangement of two or more optical axes is basically a theoretical assumption, since in practice the optical axes will usually not exactly overlap and point in the exact same direction but will overlap within some small error range. Thus, for ease of explanation, we assume axes deviations of less than +/−0.2° still as coaxial.

Typical alignment errors are in the order of +/−0.1° which can be corrected later in calibration by software.

Looking at FIG. 1a from a different perspective, according to the optical reciprocity principle, light originating on the left side in FIG. 1a, and thus entering the lens arrangement 110 from the left, will be split by the beam splitter/combiner 150. Therefore, describing that an optical path is split into two optical paths by the beam splitter/combiner (looking from left to right) is technically the same as describing that two optical paths are combined by the beam splitter/combiner (looking from right to left).

In a simple case, a semi-transparent mirror may be used as beam splitter/combiner dividing the incoming light into two parts, e.g. 50:50, one part reaching the imaging unit 120 and the other part reaching the optical source 140. Undesired distance measuring light in the imaging channel may then be filtered before it hits the imaging unit 120. In practice, however, a dichroic mirror or prism, i.e. a mirror or prism which is transparent for one wavelength range and reflective for the other, is used. This wavelength selectivity may be achieved with dichroic filters/films using the principle of thin-film interference. Using a dichroic mirror or dichroic prism thus allows using a large percentage of reflected and transmitted light, respectively.

Accordingly, depending on the light direction and the wavelength, in addition to its configuration to combine light beams, the beam splitter/combiner 150 is also configured to split light reflected from the object traversing the lens arrangement in imaging light along the optical imaging path and in distance measuring light along the optical distance measuring path.

It is clear from the above that the optical paths and optical axes are independent of the light traveling direction so that "splitting" and "combining" is merely used to better explain the optical layout. In particular, the imaging unit in these examples only receives light and does not send out any light so that the beam splitter/combiner does not combine light from the imaging unit and the optical source but is configured with an optical function that could do so, since light entering the geodetic instrument through the lens arrangement is split in different channels by the beam splitter/combiner. In other words, the optical function of the beam splitter/combiner is to combine different paths from its right side to overlap on its left side.

In one example, a laser diode of the optical source 140 may emit light in the red range of approximately 660 nm (or 635 nm) and the imaging unit 120 may image a scenery including an object reflecting visible wavelengths. Accordingly, if a dichroic mirror with a cut-off wavelength of approximately 620 nm, i.e. wavelengths larger than 620 nm are reflected, is provided (alternatively a notch filter blocking light around 635 nm), distance measuring and imaging may be achieved in separate channels with hardly any loss in intensity. Using a dichroic prism design further allows to glue a camera chip of an imaging unit directly onto parts of the prism so that a highly compact structure is achieved which is largely insensitive to temperature changes and external shocks while mechanic components for attaching and aligning a camera chip can be saved.

Additional reliability of the measurements of the surveying apparatus can be achieved if the lens 116 in the lens arrangement 110 facing the beam splitter/combiner has a convex side, e.g. a plano-convex or a bi-convex lens, which faces the beam splitter/combiner. As a result, reflections from this lens of distance measuring light from the optical source 140 may not be reflected back to the distance measuring unit 140 so as to avoid crosstalk which could lead to the detection of signals not coming from the actual target (object). Furthermore, anti-reflection coatings on the lenses of the lens arrangement may also reduce crosstalk. When using a prism as the beam splitter/combiner 150, an intermediate focus should be placed outside and not inside the prism and the surface(s) of the prism on which light is incident may be slightly tilted with respect to an orthogonal direction so that light is not fully orthogonally incident thereon. Furthermore, air gaps between individual prisms for total reflection can be provided where appropriate.

In FIG. 1b, another embodiment of a geodetic instrument is provided which further builds on the geodetic instrument 100A of FIG. 1a. Specifically, the geodetic instrument 100B comprises the same elements as the geodetic instrument 100A and additionally comprises a tracker 130.

The tracker 130 is configured to track the object, e.g., a triple prism reflector, by using preferably infrared light at a wavelength of 850 nm (or 810 nm). As directly understandable from FIG. 1b, the beam splitter/combiner 150 of FIG. 1a needs some modification to combine/split the three beam paths of the tracker 130, the imaging unit 120 and the optical source 140, respectively. Thus, the beam splitter/combiner 150' is configured in FIG. 1b to combine a part of the optical tracker path of the tracker 130, a part of the optical imaging path of the imaging unit 120 and a part of the optical source path of the optical source 140 so that the optical axis of the tracker, the optical axis of the imaging unit and the optical axis of the optical source are coaxially arranged with the optical axis of the lens arrangement 110 at least between the lens arrangement and the beam splitter/combiner 150'. Thus, the lens arrangement 110 is shared by the tracking, aiming assist and/or distance measuring and imaging functions.

In more detail, in FIG. 1b, the optical axis of the tracker 130 is shown by the dotted line 131, the optical axis of the imaging unit 120 is shown by a dot-and-dash line 121 and the optical axis of the optical source 140 is shown by the dashed line 141. In FIG. 1b, it is schematically shown how light of these optical axes is reflected and transmitted by the beam splitter/combiner 150' to coincide with the optical axis 111 of the lens arrangement 110.

The prism system shown in FIG. 1b is a multi-channel prism. In particular, the prism system comprises two prisms having wedge shapes. In a preferred embodiment, the beam splitter/combiner 150' comprises at least two wedge shaped prisms and wavelength selective surfaces. A wavelength selective surface is any surface which reflects different wavelengths differently. In the above example of the dichroic mirror (or similar dichroic prism), the dichroic mirror (or dichroic prism) may also comprise a wavelength selective surface. The more optical paths need to be combined, the more prisms or mirrors (or combinations thereof) need to be provided. Thus, in a preferred embodiment having three functional modules, such as tracker 130, imaging unit 120 and optical source 140, the prism system is made up of two dichroic prisms having dichroic mirror-like surfaces.

The skilled person realizes that instead of the two dichroic prisms shown in FIG. 1b also two dichroic mirrors may be used. Therefore, similar to FIG. 1a, the optical axes of the tracker, optical source and imaging unit can be coaxially arranged with the optical axis of the lens arrangement 110 on the left side of the beam splitter/combiner 150'.

FIG. 1c illustrates elements of another example of a geodetic instrument 100C. The geodetic instrument 100C comprises a lens arrangement 110, an imaging unit 120, a tracker 130 and a beam splitter/combiner 150. The geodetic instrument 100C corresponds to the geodetic instrument 100A but the optical source 140 is replaced by the tracker 130, wherein details of the tracker 130 were discussed with respect to FIG. 1b.

Figure 2A:
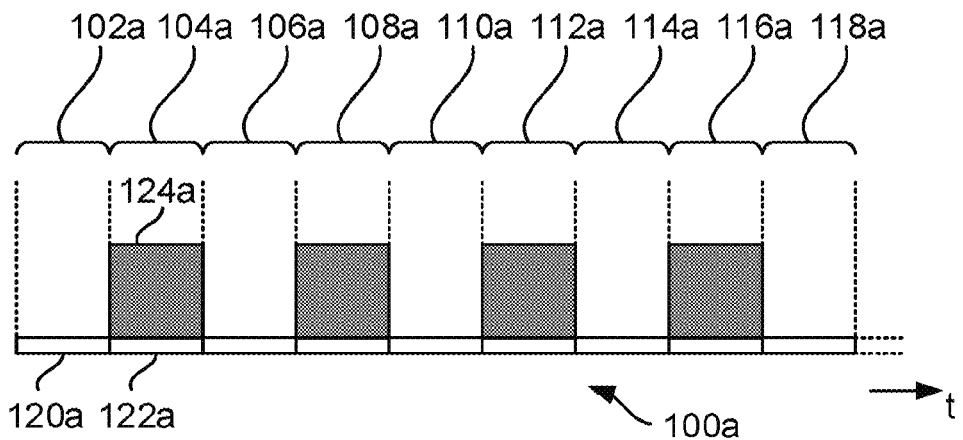
FIG. 2a schematically illustrates a frame sequence according to one embodiment.

Referring now to FIG. 2a, a frame sequence 100a is illustrated. The illustrated frame sequence 100a comprises frames 102a-118a, however it is to be understood that the frame sequence may comprise fewer or more frames. Each frame in the frame sequence 100a includes an exposure time. The first frame 102a comprises an exposure time 120a. During capture of the first frame 102a, an optical source is caused to be switched off for the full duration of the frame, i.e. the exposure time 120a, thus allowing an imaging device to obtain data from an image corresponding to the first frame 102a wherein optical pulses are absent.

In contrast, during capture of the second frame 104a, the optical source is caused to be switched on 124a for at least part of the frame, i.e. at least part of the duration of an exposure time 122a of the second frame 104a. In the illustrated frame sequence 100a, the optical source is caused to be switched on 124a for the full duration of the second frame 104a, i.e. during the duration of the exposure time 122a. Accordingly, an image corresponding to the second frame 104a may comprise data pertaining to the optical pulses.

The frame sequence 100a comprises frames belonging to a first subset of frames, wherein the optical source is caused to be switched off during the exposure time of each of said frames. In the illustrated frame sequence 100a, frames 102a, 106a, 110a, 114a and 118a are comprised in the first subset of frames. Furthermore, frames 104a, 108a, 112a, and 116a are comprised in a second subset of frames, wherein the optical source is caused to be switched on during at least part of each of said frames. Synchronization of the emission of the optical pulses to the frame sequence 100a is thus achieved.

The frame rate of the frame sequence 100a and/or the peak power of the optical source may affect how the synchronization of the emission of the optical pulses is to be performed. For example, a frame sequence having a frame rate of 50 Hz, i.e. each frame having a duration of 20 ms, will in the illustrated embodiment have, per second, 25 frames belonging to the first subset of frames and 25 frames belonging to the second subset of frames. Since data from images in which the optical pulses are absent is to be processed, only data pertaining to the first subset of frames will be utilized, thereby compensating for the possible occurrence of cross-talk. Accordingly, a display unit displaying configured to display the scene captured by the imaging device may display 25 unique frames per second. To that end, the term "unique" is to be understood as a frame in the frame sequence that has not been created by duplication or insertion of another frame in said frame sequence. Furthermore, even in case each frame in the first subset is duplicated to create a modified frame sequence of 50 frames per second, the modified frame sequence will only comprise 25 unique frames, each being displayed twice in succession for a total duration of 40 ms. The perceived frame rate of such a modified frame sequence being displayed on a display device would hence be 25 frames per second.

Furthermore, following the example as set out in the previous paragraph, the optical source may switch between an operating state and a non-operating state repeatedly, each operating period being 20 ms and each non-operating period also being 20 ms. A duty cycle of the optical source may thus be said to be 50%. Depending on the peak power of the optical source, such switching may still form, when viewed directly by a user, a perceived continuous spot of light on a target impinged by said optical pulses.

The frame sequence 100a comprises a first subset of frames including every 2nd frame of the frame sequence. Accordingly, the second subset of frames also includes every 2nd frame of the frame sequence. It is however envisioned that the first subset of frames may include every Nth frame of the frame sequence, wherein N is comprised between 2 and 10. It is also envisioned that the second subset may include every Nth frame of the frame sequence, wherein N is comprised between 2 and 10

Figure 2B:
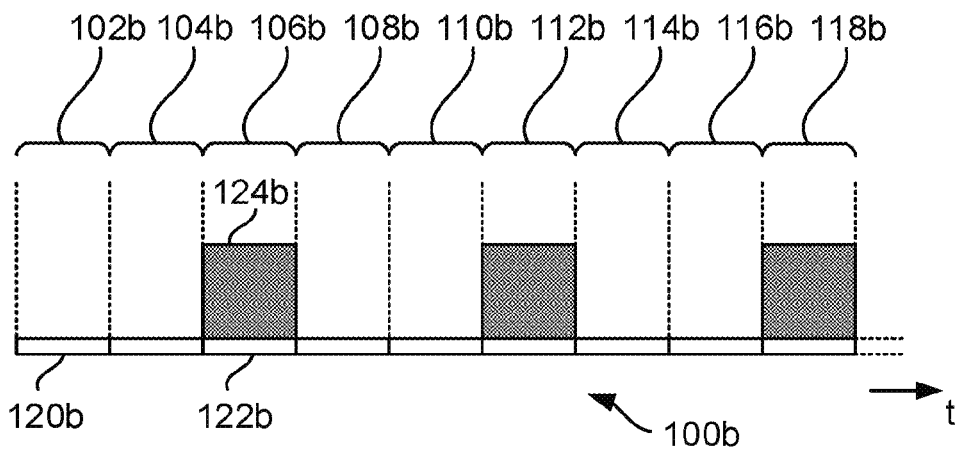
FIG. 2b schematically illustrates a frame sequence according to one embodiment.

Referring now to FIG. 2b, a frame sequence 100b is illustrated. The illustrated frame sequence 100b comprises frames 102b-118b, however it is to be understood that the frame sequence may comprise fewer or more frames. Each frame in the frame sequence 100b includes an exposure time. The first frame 102b comprises an exposure time 120b. During capture of the first frame 102b, an optical source is caused to be switched off for the full duration of the frame, i.e. the exposure time 120b, thus allowing an imaging device to obtain data from an image corresponding to the first frame 102b wherein optical pulses are absent.

In contrast, during capture of the third frame 106b, the optical source is caused to be switched on 124b for at least part of the frame, i.e. at least part of the duration of an exposure time 122b of the third frame 106b. In the illustrated frame sequence 100b, the optical source is caused to be switched on 124b for the full duration of the third frame 106b, i.e. during the duration of the exposure time 122b. Accordingly, an image corresponding to the third frame 104b may comprise data pertaining to the optical pulses.

The frame sequence 100b comprises frames belonging to a first subset of frames, wherein the optical source is caused to be switched off during the exposure time of each of said frames. In the illustrated frame sequence 100b, frames 102b, 104b, 108b, 110b, 114b and 116b are comprised in the first subset of frames. Furthermore, frames 106b, 112b and 118b are comprised in a second subset of frames, wherein the optical source is caused to be switched on during at least part of each of said frames. Synchronization of the emission of the optical pulses to the frame sequence 100b is thus achieved.

In the frame sequence 100b, two thirds of the frames belong to the first subset of frames, while one third of the frames belong to the second subset of frames. Accordingly, a frame sequence having a frame rate of e.g. 60 Hz, will have, per second, 40 frames belonging to the first subset of frames and 20 frames belonging to the second subset of frames. Hence, 40 images per second in which the optical pulses are absent may be captured. Likewise, the optical source may switch between an operating state and a non-operating state repeatedly, each operating period being 20 ms and each non-operating period being 40 ms. A duty cycle of the optical source may thus be said to be approximatively 33%. Depending on the peak power of the optical source, such switching may still form, when viewed directly by a user, a perceived continuous spot of light on a target impinged by said optical pulses. Further, a video generated based on the data obtained from the first subset of frames will not suffer from cross-talk.

The frame sequence 100b comprises a second subset of frames including every 3rd frame of the frame sequence. It is however envisioned that the second subset of frames may include every Nth frame of the frame sequence, wherein N is comprised between 2 and 10.

Figure 2C:
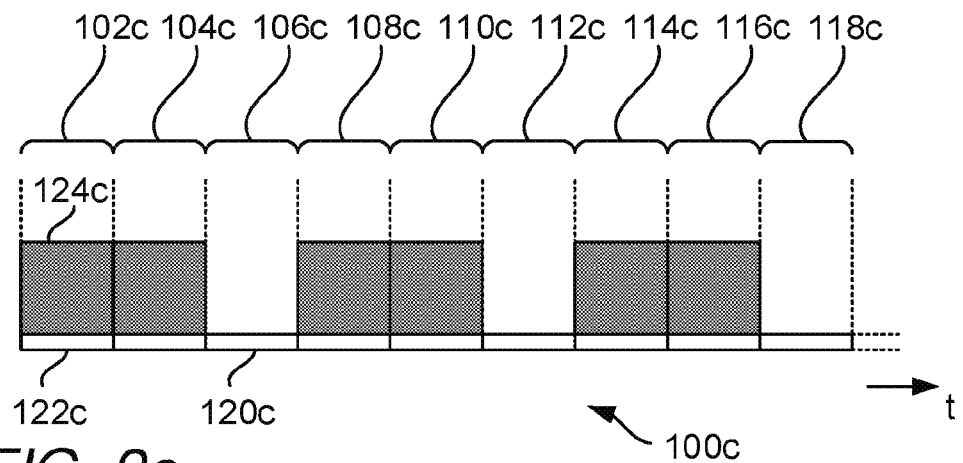
FIG. 2c schematically illustrates a frame sequence according to one embodiment.

Referring now to FIG. 2c, a frame sequence 100c is illustrated. The illustrated frame sequence 100c comprises frames 102c-118c, however it is to be understood that the frame sequence may comprise fewer or more frames. Each frame in the frame sequence 100c includes an exposure time. The third frame 106c comprises an exposure time 120c. During capture of the third frame 106c, an optical source is caused to be switched off for the full duration of the frame, i.e. the exposure time 120c, thus allowing an imaging device to obtain data from an image corresponding to the third frame 102c wherein optical pulses are absent (thereby avoiding the presence of cross-talk).

In contrast, during capture of the first frame 102c, the optical source is caused to be switched on 124c for at least part of the frame, i.e. at least part of the duration of an exposure time 122c of the first frame 102c. In the illustrated frame sequence 100c, the optical source is switched on 124c for the full duration of the first frame 102c, i.e. during the duration of the exposure time 122c. Accordingly, an image corresponding to the first frame 104c may comprise data pertaining to the optical pulses.

The frame sequence 100c comprises frames belonging to a first subset of frames, wherein the optical source is caused to be switched off during the exposure time of each of said frames. In the illustrated frame sequence 100b, frames 106c, 112c and 118c are comprised in the first subset of frames. Furthermore, frames 102c, 104c, 108c, 110c, 114c and 116c are comprised in a second subset of frames, wherein the optical source is caused to be switched on during at least part of each of said frames. Synchronization of the emission of the optical pulses to the frame sequence 100c is thus achieved.

In the frame sequence 100c, one third of the frames belong to the first subset of frames, while two thirds of the frames belong to the second subset of frames. Accordingly, a frame sequence having a frame rate of e.g. 60 Hz, will have, per second, 20 frames belonging to the first subset of frames and 40 frames belonging to the second subset of frames. Hence, 20 images per second in which the optical pulses are absent may be captured. Likewise, the optical source may switch between an operating state and a non-operating state repeatedly, each operating period being 40 ms and each non-operating period being 20 ms. A duty cycle of the optical source may thus be said to be approximatively 67%. Depending on the peak power of the optical source, such switching may still form, when viewed directly by a user, a perceived continuous spot of light on a target impinged by the optical pulses.

The frame sequence 100c comprises a first subset of frames including every 3rd frame of the frame sequence. It is however envisioned that the first subset of frames may include every Nth frame of the frame sequence, wherein N is comprised between 2 and 10.

With reference to FIGS. 2a-2c, in each respective frame sequence, a frame from the first subset is interleaved with one or more frames from the second subset, or, a frame from the second subset is interleaved with one or more frames from the first subset. Hereby, synchronization of the emission of the optical pulses to the frame sequence is achieved, allowing data from images in which the optical pulses are absent to be obtained. As a result, the quality of the image sequence or video provided by the instrument is improved as the occurrence of cross-talk in the optical channel commonly shared by the imaging device and the optical source is avoided, or at least reduced.

Figure 3A:
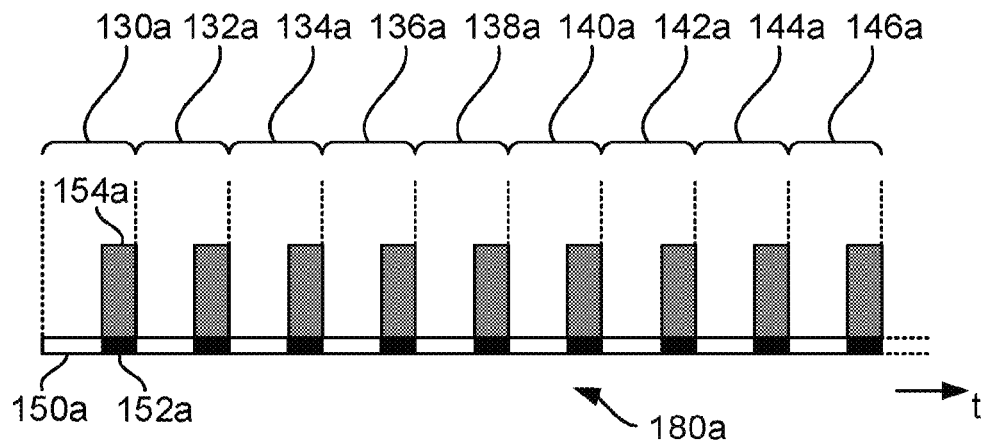
FIG. 3a schematically illustrates a frame sequence according to one embodiment.

Referring now to FIG. 3a, a frame sequence 180a is illustrated. The illustrated frame sequence 180a comprises frames 130a-146a, however it is to be understood that the frame sequence may comprise fewer or more frames. Each frame in the frame sequence 180a includes an exposure time and at least one intermission time. The first frame 130a comprises an exposure time 150a, and an intermission time 152a. During capture of the first frame 130a, an optical source is caused to be switched off for the full duration of the exposure time 150a, thus allowing an imaging device to obtain data from an image corresponding to the first frame 130a in which optical pulses are absent. Furthermore, during at least part of the intermission time 152a, the optical source is caused to be switched on. Hence, light emitted by the optical source is not captured by the imaging device in the first frame 130a, however optical pulses may still form a spot on a target for assisting a user in aiming at the target.

In the illustrated frame sequence 180a, all remaining frames 132a-146a of the frame sequence 180a are configured according to what has been described in the previous paragraph with regards to the first frame 130a, i.e. each frame comprises an exposure time, during which the optical source is caused to be switched off, and at least one intermission time, during at least part of which the optical source is caused to be switched on.

Owing to the shorter exposure time with respect to the duration of each frame, as compared to the embodiments described in conjunction with FIGS. 2a-2c, a gain of the imaging device may be increased to achieve adequate images. Furthermore, it may be noted that the optical source is not turned on during the exposure time of any frame. Hence, an imaging device capturing images via the frame sequence 180a will acquire no images in which light emitted by the optical source is present.

Still referring to FIG. 3a, optical pulses emitted by an optical source is synchronized to the frame sequence 180a such that the optical source is caused to be switched on during at least part of the at least one intermission time for every frame within the frame sequence 180a.

Figure 3B:
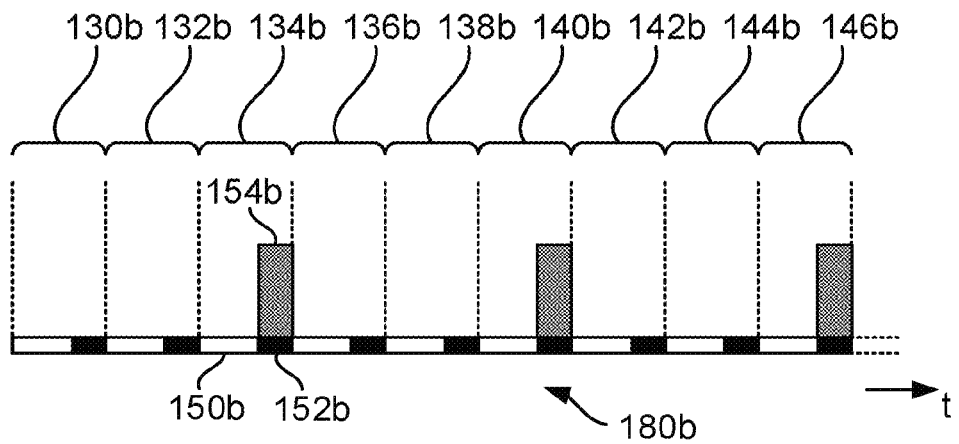
FIG. 3b schematically illustrates a frame sequence according to one embodiment.

Referring now to FIG. 3b, a frame sequence 180b is illustrated. The illustrated frame sequence 180b comprises frames 130b-146b, however it is to be understood that the frame sequence may comprise fewer or more frames. Each frame in the frame sequence 180b includes an exposure time and at least one intermission time. The third frame 134b comprises an exposure time 150b, and an intermission time 152b. During capture of the third frame 134b, an optical source is caused to be switched off for the full duration of the exposure time 150b, thus allowing an imaging device to obtain data from an image corresponding to the third frame 134b in which optical pulses are absent. Furthermore, during at least part of the intermission time 152b, the optical source is caused to be switched on. Hence, light emitted by the optical source is not captured by the imaging device in the third frame 134b, however optical pulses may still form a spot on a target for assisting a user in aiming at the target.

In the illustrated frame sequence 180b, every third frame is configured according to what has been described in the previous paragraph with regards to the third frame 134b, i.e. frames 134b, 140b, 146b each comprise an exposure time, during which the optical source is caused to be switched off, and at least one intermission time, during at least part of which the optical source is caused to be switched on. To this end, it is further envisioned that the optical source may be caused to be switched on during at least part of the at least one intermission time for every frame, every other frame, every third frame, every fourth frame, every fifth frame, or more generally, every Kth frame, wherein K is comprised between 1 and 10.

Figure 3C:
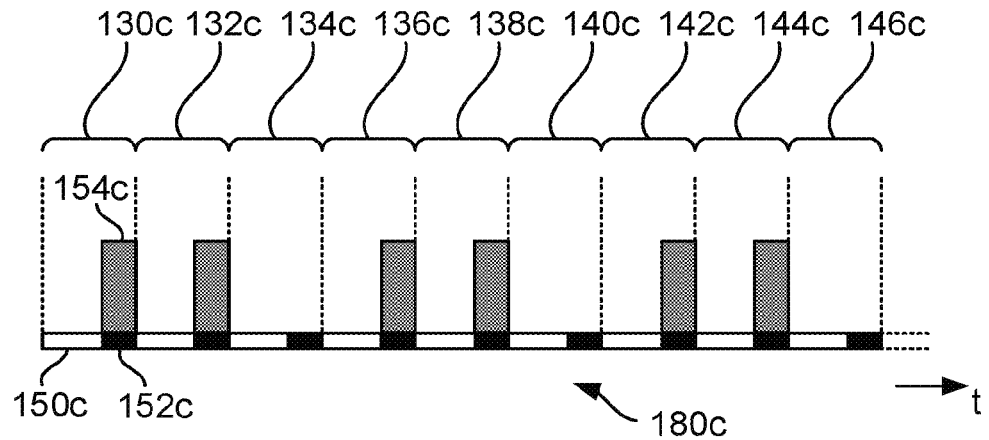
FIG. 3c schematically illustrates a frame sequence according to one embodiment.

Referring now to FIG. 3c, a frame sequence 180c is illustrated. The illustrated frame sequence 180c comprises frames 130c-146c, however it is to be understood that the frame sequence may comprise fewer or more frames. Each frame in the frame sequence 180c includes an exposure time and at least one intermission time. The first frame 130c comprises an exposure time 150c, and an intermission time 152c. During capture of the first frame 130c, an optical source is caused to be switched off for the full duration of the exposure time 150c, thus allowing an imaging device to obtain data from an image corresponding to the first frame 130c in which optical pulses are absent. Furthermore, during at least part of the intermission time 152c, the optical source is caused to be switched on. Hence, light emitted by the optical source is not captured by the imaging device in the first frame 130c, however optical pulses may still form a spot on a target for assisting a user in aiming at the target.

In the illustrated frame sequence 180c, for every third frame in the frame sequence 180c, the optical source is caused to be turned off not only during the exposure time of the frame, but also during the intermission time of the frame. Consequently, frames 134b, 140b, 146b each comprise an exposure time, during which the optical source is caused to be switched off, and at least one intermission time, during which the optical source is also caused to be switched off. In contrast, frames 130c, 132c, 136c, 138c, 142c, 144c, each comprise an exposure time, during which the optical source is caused to be switched off, and at least one . . . intermission time, during which the optical source is caused to be switched on. To this end, it is further envisioned that the optical source may be caused to be turned off during the exposure time and the intermission time, i.e. the full duration, of a frame, for every other frame, every third frame, every fourth frame, every fifth frame, or more generally, every Mth frame, wherein M is comprised between 2 and 10.

Figure 4:
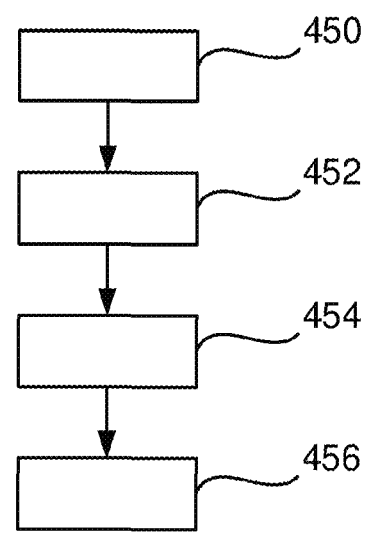
FIG. 4 schematically illustrates, in a flowchart diagram, a method for operating a geodetic instrument.

A method for operating a geodetic instrument according to the inventive concept will now be described with reference to FIG. 4. The geodetic instrument comprises an optical source for assisting a user in aiming at a target in a scene and an imaging device, wherein the imaging device and the optical source share a common optical channel within the geodetic instrument, said method comprising: causing emission 450, by the optical source, of optical pulses towards the target; causing capture 452, by the imaging device, of images of the scene using a frame sequence, wherein a frame of said frame sequence includes an exposure time during which the imaging device is exposed to light from the scene; synchronizing emission 454 of the optical pulses to the frame sequence for obtaining data from images in which the optical pulses are absent; and processing 456 the obtained data for surveying said scene.

For clarity and simplicity, the method will be described in terms of 'steps'. It is emphasized that steps are not necessarily processes that are delimited in time or separate from each other, and more than one 'step' may be performed at the same time in a parallel fashion.

As is readily appreciated by the person skilled in the art, many modifications and variations may be devised given the above description of the principles of the inventive concept. It is intended that all such modifications and variations be considered as within the scope of the inventive concept, as it is defined in the appended patent claims.

The invention claimed is:

1. A method for operating a geodetic instrument comprising an optical source for assisting a user in aiming at a target in a scene and an imaging device, wherein the imaging device and the optical source share a common optical channel within the geodetic instrument, said method comprising:

causing emission, by the optical source, of optical pulses towards the target;

causing capture, by the imaging device, of images of the scene using a frame sequence, wherein a frame of said frame sequence includes an exposure time during which the imaging device is exposed to light from the scene, and wherein the frame sequence comprises a first subset of frames;

synchronizing emission of the optical pulses to the frame sequence for obtaining data from images in which the optical pulses are absent, wherein the synchronizing comprises causing the optical source to be in a non-operating state during the exposure time of each frame of the first subset;

processing data pertaining only to each frame of the first subset of frames; and causing the processed data pertaining only to each frame of the first subset of frames to be displayed as frames on a display.

2. The method according to claim 1, wherein the frame sequence further comprises a second subset of frames, the first subset and the second subset being mutually exclusive subsets, the synchronizing further comprising:

causing the optical source to be in an operating state during at least part of each frame of the second subset.

3. The method according to claim 2, wherein the frame sequence includes a frame from the first subset being interleaved with one or more frames from the second subset or wherein the frame sequence includes a frame from the second subset being interleaved with one or more frames from the first subset.

4. The method according to claim 2, further comprising:

discarding data pertaining to each frame of the second subset.

5. The method according to claim 2, wherein the second subset includes every Nth frame of the frame sequence, wherein N is comprised between 2 and 10.

6. The method according to claim 1, wherein a frame further includes at least one intermission time during which the imaging device is configured to not register light from the scene, the method further comprising:

for at least some of the frames of the frame sequence or the first subset, causing the optical source to be in an operating state during at least part of said at least one intermission time.

7. The method according to claim 6, wherein the synchronizing further includes causing the optical source to be in the operating state during at least part of said at least one intermission time for every Kth frame of the frame sequence, wherein K is comprised between 1 and 10.

8. The method according to claim 1, wherein the optical source is a laser pointer or the optical source of an electronic distance measurement unit of the geodetic instrument.

9. A geodetic instrument comprising:

an optical source for assisting a user in aiming at a target in a scene, said optical source being arranged to emit optical pulses towards the target/scene;

an imaging device configured to capture images of the scene using a frame sequence, wherein a frame of said frame sequence includes an exposure time during which the imaging device is exposed to light emission from the scene, and wherein the frame sequence comprises a first subset of frames;

wherein the imaging device and the optical source share a common optical channel within the geodetic instrument, and a processing unit configured to:
synchronize emission of the optical pulses to the frame sequence for obtaining data from images in which the optical pulses are absent, wherein the synchronizing comprises causing the optical source to be in a non-operating state during the exposure time of each frame of the first subset,
process data pertaining only to each frame of the first subset of frames, and
cause the processed data pertaining only to each frame of the first subset of frames to be displayed as frames on a display.

10. The geodetic instrument according to claim 9, wherein the frame sequence further comprises a second subset of frames, the first subset and the second subset being mutually exclusive subsets, the geodetic instrument being further configured to cause the optical source to be in an operating state during at least part of the exposure time of each frame of the second subset.

11. The geodetic instrument according to claim 10, wherein the frame sequence includes a frame from the first subset being interleaved with one or more frames from the second subset or wherein the frame sequence includes a frame from the second subset being interleaved with one or more frames from the first subset.

12. The geodetic instrument according to claim 10, further being configured to discard data pertaining to each frame of the second subset.

13. The geodetic instrument according to claim 10, wherein the second subset includes every Nth frame of the frame sequence, wherein N is comprised between 2 and 10.

14. The geodetic instrument according to claim 9, wherein a frame of the frame sequence further includes at least one intermission time during which the imaging device is configured to not register light from the scene, the geodetic instrument being further configured to, for at least some of the frames of the frame sequence or of the first subset, cause the optical source to be in an operating state during at least part of said at least one intermission time.

15. The geodetic instrument according to claim 14, further being configured to cause the optical source to be in the operating state during at least part of said at least one intermission time of every Kth frame of the frame sequence, wherein K is comprised between 1 and 10.

16. The geodetic instrument according to claim 9, wherein the optical source is the optical source of an electronic distance measurement unit, or a laser pointer, of the geodetic instrument.

17. A processing unit of a geodetic instrument adapted to determine a distance and/or a direction to a target of a scene, wherein the processing unit is configured to operate the geodetic instrument in accordance with a method as defined in claim 1.

* * * * *